Sept. 30, 1969 — T. M. HAMLINE — 3,469,287

HOOK AND LINE STRUCTURE

Filed Oct. 16, 1967 — 2 Sheets-Sheet 1

INVENTOR.
THOMAS M. HAMLINE
BY
Fishburn, Gold & Litman
ATTORNEYS

Sept. 30, 1969     T. M. HAMLINE     3,469,287

HOOK AND LINE STRUCTURE

Filed Oct. 16, 1967     2 Sheets-Sheet 2

INVENTOR.
THOMAS M. HAMLINE
BY
Fishburn, Bold & Litman
ATTORNEYS

United States Patent Office 3,469,287
Patented Sept. 30, 1969

3,469,287
HOOK AND LINE STRUCTURE
Thomas M. Hamline, 9505 Grand,
Kansas City, Mo. 64114
Filed Oct. 16, 1967, Ser. No. 675,421
Int. Cl. A47k 10/12
U.S. Cl. 24—73       5 Claims

ABSTRACT OF THE DISCLOSURE

A hook and line structure includes a first hook having an elongated shaft, a cleat mounted on the elongated shaft, a fastener portion, a second hook having an eye at the end of a shaft, and a line having one end secured to the fastener portion and the other end secured to the second hook eye. A rope guiding eye is positioned adjacent the free end of the first hook elongated shaft to engage and maintain the rope adjacent the elongated shaft.

---

The principal objects of the present invention are: to provide a line and hook structure adapted to be used as a hanger and adapted to be used as a bathroom accessory for supporting personal hygiene articles and equipment; to provide such a structure having hooks secured at each end of a line or rope and a cleat mounted on one of the hooks for winding excess rope therearound; to provide such a structure adapted to support appropriate articles of various kinds and especially devices supplementing built in fixtures in bathrooms, kitchens, workrooms and the like to thereby render the activities therein more comfortable and satisfactory; to provide such a structure having easy access to the various articles supported thereon; and to provide such a structure which is a simple, practical and inexpensive accessory in the form of a hanger which can be easily applied to a support member and used for supporting articles and equipment of various kinds and which may be easily removed and transported with or without the articles thereon.

Other objects and advantages of this invention will become apparent from the following description taken in connection with the accompanying drawings wherein are set forth by way of illustration and example certain embodiments of this invention.

Figure 1:
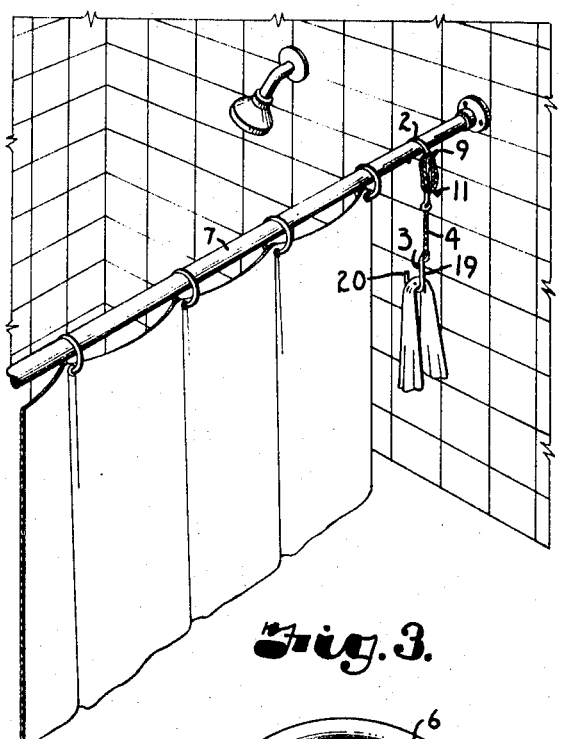
FIG. 1 is a perspective view of a hook and rope structure embodying features of the present invention and illustrating one application therefor.
Figure 3:
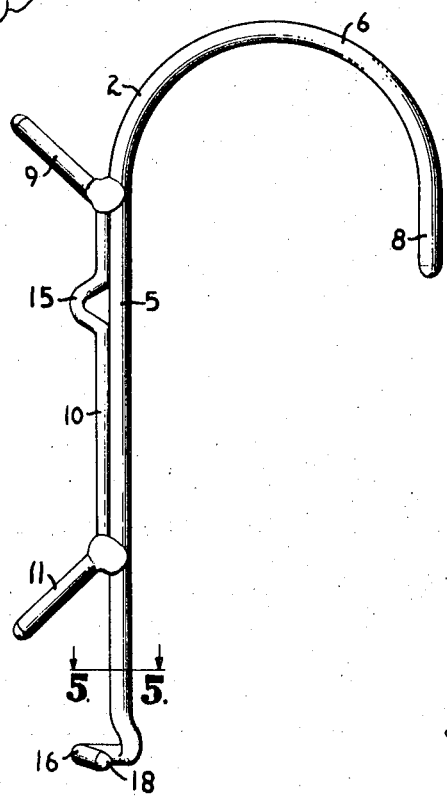
FIG. 3 is an elevation of the cleat hook.

Referring more in detail to the drawings:

The reference numeral 1 generally designates a hook and line or rope structure which includes a first or cleat hook 2 and a second hook 3 connected together by a rope 4 or other suitable flexible connecting means.

Figure 2:
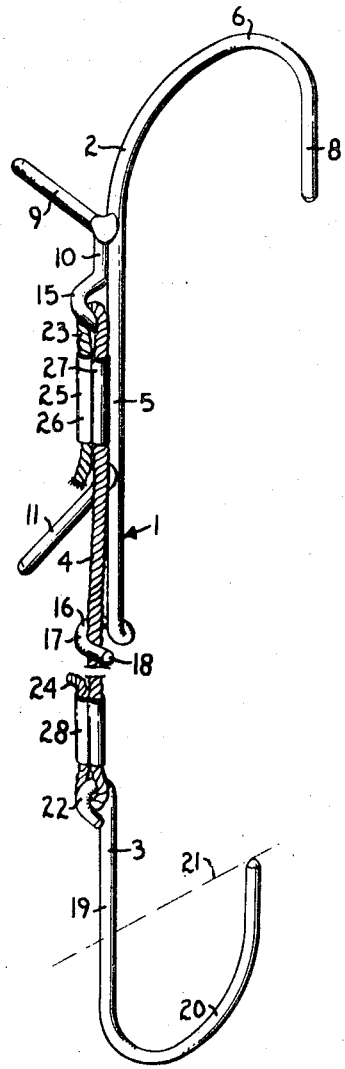
FIG. 2 is an enlarged perspective view of the hook and rope structure.
Figure 4:
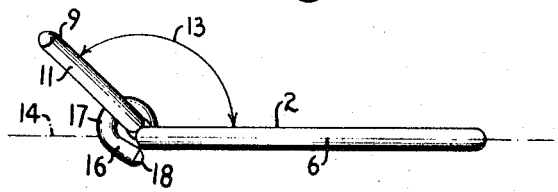
FIG. 4 is a top end view of the cleat hook.
Figure 5:
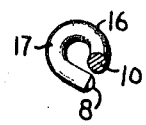
FIG. 5 is a sectional view of the cleat hook shaft taken on line 5—5, FIG. 3.
Figure 6:
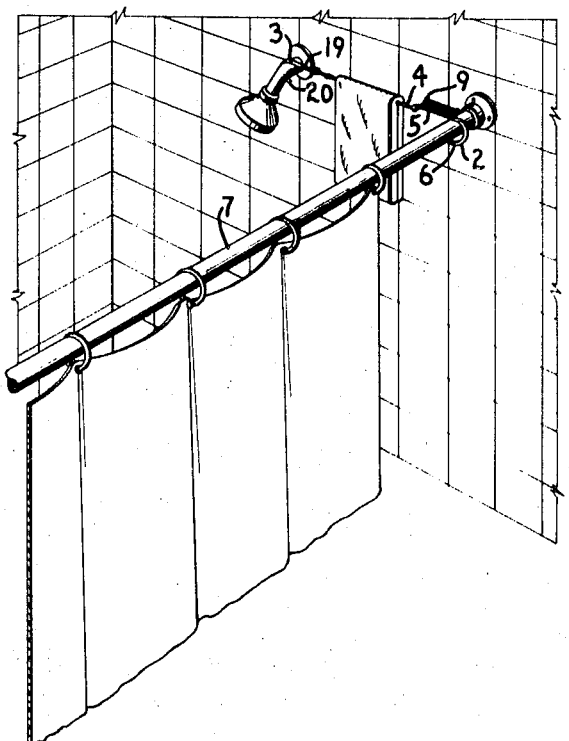
FIG. 6 is a perspective view of the hook and rope structure employed as a hanger line.

The cleat hook 2 is generally the upper hook and comprises a shank or elongated shaft 5 having an integrally formed reversely bent hook portion 6 or engaging member which is designed to engage a supporting means such as a shower curtain rod 7 or other suitable support. As shown in FIG. 2 an end portion 8 of the hook 6 is substantially parallel to the shank 5 whereby the hook is generally U shaped.

The shank 5 of the first hook 2 has a cleat 9 formed therein or attached thereto. In the illustrated structure the cleat 9 has a body member 10 which is contiguous with and suitably secured to the shaft 5, as for example, by welding. Arms 11 extends outwardly from opposed ends of the body member 10. The arms 11 preferably are arranged substantially in a plane defined by said arms 11 and body 10 which is at an angle 13 with a plane 14 defined by the shank 5 and the hook portion 6.

A fastening member 15 is formed on the hook structure 2 and in the illustrated structure it is an eye portion formed in the body member 10 by a portion of the body member 10 in a reverse bend outwardly from the shank 5. The eye portion 15 is substantially in the plane formed by the arms 11 and body member 10.

A rope guide 16 is arranged between the cleat 9 and the free end of the shank 5. In the structure illustrated the rope guide is an eye consisting of a spiral or loop 17 positioned substantially perpendicular to the plane 14 and having a free end 18 spaced from the shank 5 a distance sufficient to permit the rope 4 to be inserted into the rope guiding eye 16 and maintained therein at a position substantially parallel with the shank 5.

The second hook 3 consists of a shaft or shank 19 having a hook portion 20 positioned substantially parallel with the shaft 19 and forming a plane 21, extending through the shaft 19 and the hook portion 20.

A line fastener such as an eye 22 is formed in the shaft 19 at an end opposite the hook portion 20. The eye 22 preferably is substantially in the plane 21.

One end 23 of the rope 4 is suitably secured in the eye portion 15 of the cleat body member 10 and the other end 24 is suitably secured to the eye 22 of the second hook 3. The one end 23 of the rope 4 extends through the eye portion 15 and is positioned adjacent the rope 4 where the one end 23 and the rope 4 are secured together as by a metal clamp or sleeve 25. A first tubular portion 26 of the metal clamp 25 engages the one end 23 and a second tubular portion 27 engages the rope 4. Another fastener such as a metal clamp 28 similarly engages the other end 24 and the rope 4 to secure same in the eye 22 of the second hook 3.

In use the first hook 2 is placed on a suitable supporting means such as a peg (not shown) in a work shop, a bar or rod (not shown) in a kitchen, or a shower curtain rod 7 in a bathroom. The rope 4 is then wound around the cleat 9 until the second hook 3 is at the desired height to provide easy accessibility to an article placed thereon. As a clothes line the first hook 2 and the second hook 3 are hooked on suitable arms of a clothes line pole (not shown) or any suitable members adapted to engage and retain the cleat hook 2 and the second hook 3 respectively with the members being placed substantially at the same level and any excess rope is wound around the cleat 9 until the desired level of the rope is achieved.

What I claim and desire to secure by Letters Patent is:
1. A hook and line structure comprising:
   (a) a first hook having an elongated shaft and a cleat portion thereon and a line fastener,
   (b) a second hook having a shaft with a line fastener at the end of said shaft,
   (c) a flexible connecting line having one end secured to said fastener on the first hook and the other end secured to the line fastener of said second hook,
   (d) a guiding eye positioned adjacent a free end of said first hook elongated shaft,
   (e) said eye terminating in a free end spaced from said elongated shaft a distance sufficient to permit entrance of said flexible connecting line into said guiding eye.
2. A hook and line structure as set forth in claim 1 wherein the cleat portion includes:
   (a) an elongate body member secured to the first hook shaft,

(b) arms on opposed ends of the body member and extending outwardly therefrom.

3. A hook and line structure as set forth in claim 2 wherein:
(a) said cleat arms are positioned at opposed ends of said cleat body member and extend outwardly therefrom at an angle with the plane of said elongated shaft and first hook, and
(b) said cleat body member is contiguous with said first hook elongated shaft and the fastener on the first hook is an eye portion in said cleat body member extending outwardly therefrom.

4. A hook and line structure as set forth in claim 3 wherein:
(a) the flexible connecting line has one end extending through said cleat body eye portion and reversely turned and positioned alongside an adjacent portion of said flexible connecting line,
(b) a metal clamp engaging said one end portion and said adjacent flexible connecting line to secure same together,
(c) said other end of the flexible connecting line extending through said eye of said second hook and reversely turned and positioned alongside an adjacent, portion of said flexible connecting line, and
(d) a second metal clamp engaging said other end portion and said flexible connecting line.

5. A hook and line structure as set forth in claim 4 wherein:
(a) said guiding eye on the first hooks elongated shaft is positioned substantially perpendicular to said elongated shaft whereby said flexible connecting line is substantially parallel with said elongated shaft.

References Cited

UNITED STATES PATENTS

| 1,341,591 | 5/1920 | Rudolph | 211—119.12 |
| 2,653,719 | 9/1953 | Field | 211—119.12 |
| 3,328,064 | 6/1967 | Simon. | |

DONALD A. GRIFFIN, Primary Examiner

U.S. Cl. X.R.

211—119.12